(12) United States Patent
Kennedy

(10) Patent No.: US 12,326,862 B2
(45) Date of Patent: Jun. 10, 2025

(54) SOURCE INDEPENDENT QUERY LANGUAGE FOR APPLICATION LAYER

(71) Applicant: Jitterbit, Inc., Alameda, CA (US)

(72) Inventor: Thomas R. Kennedy, Miami Beach, FL (US)

(73) Assignee: JITTERBIT, INC., Alameda, CA (US)

( * ) Notice: Subject to any disclaimer, the term of this patent is extended or adjusted under 35 U.S.C. 154(b) by 0 days.

(21) Appl. No.: 18/455,454

(22) Filed: Aug. 24, 2023

(65) Prior Publication Data

US 2024/0078236 A1 Mar. 7, 2024

Related U.S. Application Data

(60) Provisional application No. 63/403,521, filed on Sep. 2, 2022.

(51) Int. Cl.
| | | |
|---|---|---|
| *G06F 17/00* | (2019.01) | |
| *G06F 16/242* | (2019.01) | |
| *G06F 16/2453* | (2019.01) | |
| *G06F 16/25* | (2019.01) | |

(52) U.S. Cl.
CPC .... *G06F 16/24549* (2019.01); *G06F 16/2448* (2019.01); *G06F 16/252* (2019.01)

(58) Field of Classification Search
CPC .......... G06F 16/24549; G06F 16/2448; G06F 16/252
See application file for complete search history.

(56) References Cited

U.S. PATENT DOCUMENTS

| | | |
|---|---|---|
| 7,062,502 B1 | 6/2006 | Kesler |
| 7,299,493 B1 | 11/2007 | Burch et al. |
| 7,657,881 B2 | 2/2010 | Nagendra et al. |
| 7,676,499 B2 | 3/2010 | Dorsett, Jr. |
| 7,809,694 B2 * | 10/2010 | Nelson ................ G06F 16/2453 707/688 |
| 8,032,509 B2 | 10/2011 | Piedmonte |
| 8,417,715 B1 | 4/2013 | Bruckhaus et al. |
| 8,863,156 B1 | 10/2014 | Lepanto et al. |
| 9,185,125 B2 | 11/2015 | Varsanyi et al. |
| 9,275,099 B1 | 3/2016 | Kennedy, Jr. |
| 9,547,687 B2 | 1/2017 | Kennedy, Jr. |
| 9,705,918 B2 | 7/2017 | Porras et al. |
| 9,886,483 B1 | 2/2018 | Harrison et al. |
| 10,496,632 B2 * | 12/2019 | Kennedy, Jr. ....... G06F 16/2455 |
| 10,558,644 B2 | 2/2020 | Kennedy, Jr. |
| 11,586,607 B2 | 2/2023 | Kennedy, Jr. |
| 2004/0226031 A1 | 11/2004 | Zimmerman et al. |
| 2005/0289013 A1 | 12/2005 | Goldberg |

(Continued)

*Primary Examiner* — Greta L Robinson
(74) *Attorney, Agent, or Firm* — Fredrikson & Byron, P.A.

(57) ABSTRACT

The data processing system described in this specification enables a user to generate non-application specific statements for controlling execution of an application that executes on a user device (client device). The application can include a browser. The statements can be written to control behavior of a webpage or application at the user. The data processing system enables a user to provide non-application specific statements, such as SQL queries or commands. These non-application specific commands are uniform in syntax an enable the user to access other systems, such as web services, databases, and so forth, using the commands with a uniform syntax.

20 Claims, 11 Drawing Sheets

(56) References Cited

U.S. PATENT DOCUMENTS

| | | |
|---|---|---|
| 2005/0289125 A1 | 12/2005 | Liu et al. |
| 2006/0020582 A1 | 1/2006 | Dettinger et al. |
| 2006/0134712 A1 | 6/2006 | Stromgren et al. |
| 2007/0027905 A1 | 2/2007 | Warren et al. |
| 2007/0038985 A1 | 2/2007 | Meijer et al. |
| 2007/0169017 A1 | 7/2007 | Coward |
| 2008/0046981 A1 | 2/2008 | Philyaw |
| 2008/0120286 A1 | 5/2008 | Dettinger et al. |
| 2008/0222616 A1 | 9/2008 | Cheng et al. |
| 2008/0256082 A1 | 10/2008 | Davies et al. |
| 2009/0254516 A1 | 10/2009 | Meiyyappan et al. |
| 2010/0036801 A1 | 2/2010 | Pirvali et al. |
| 2010/0114932 A1 | 5/2010 | Whitcher et al. |
| 2010/0185645 A1 | 7/2010 | Pazdziora |
| 2010/0306220 A1 | 12/2010 | Sthanikam et al. |
| 2010/0325122 A1 | 12/2010 | Yassin |
| 2011/0209131 A1 | 8/2011 | Hohenstein et al. |
| 2011/0246415 A1 | 10/2011 | Li et al. |
| 2012/0166238 A1 | 6/2012 | Mohanty et al. |
| 2013/0066801 A1 | 3/2013 | Phillips |
| 2013/0166539 A1 | 6/2013 | Clark et al. |
| 2013/0282710 A1 | 10/2013 | Raghavan et al. |
| 2013/0311445 A1 | 11/2013 | Narita |
| 2013/0339293 A1 | 12/2013 | Witten et al. |
| 2014/0075519 A1 | 3/2014 | Porras et al. |
| 2014/0095814 A1 | 4/2014 | Marden et al. |
| 2014/0172833 A1 | 6/2014 | Taylor |
| 2014/0214890 A1 | 7/2014 | Johnson |
| 2014/0214897 A1 | 7/2014 | Zhu et al. |
| 2014/0244680 A1 | 8/2014 | Chandran et al. |
| 2014/0258341 A1 | 9/2014 | Mazoue |
| 2014/0279837 A1* | 9/2014 | Guo ................ G06F 16/282 707/603 |
| 2014/0379693 A1 | 12/2014 | May et al. |
| 2015/0212864 A1 | 7/2015 | Scrimo, Jr. |
| 2015/0227135 A1 | 8/2015 | Mcadam et al. |
| 2015/0317361 A1 | 11/2015 | Battaglia et al. |
| 2016/0026680 A1 | 1/2016 | Banerjee et al. |
| 2017/0169068 A1 | 6/2017 | Kennedy, Jr. |
| 2017/0262498 A1 | 9/2017 | Kennedy |
| 2021/0081389 A1* | 3/2021 | Liu ................ G06F 16/24552 |

\* cited by examiner

FIG. 1C

| | | |
|---|---|---|
| Company: | 702 | *General Store Company* |
| Auth Type: | 704 | Basic auth ▽ |
| Auth Parameter(s) | 706 | |
| Return Format | 708 | json ▽ |
| Return Format Parameter: | 710 | |
| Pagination: | 712 | index ▽ |

Pagination Parameters:     Index: 714   index

Limit: 716   limit

Parameter Type 718     query string ▽

Sample Call                    720 snapi.zudy.com?index=XX&index=XX

Parameters:    722

| |
|---|
| index |
| limit |
| |
| |
| |
| |
| |
| |

FIG. 7

SOURCE INDEPENDENT QUERY LANGUAGE FOR APPLICATION LAYER

CROSS REFERENCE TO RELATED APPLICATION

This application claims the benefit of U.S. Provisional Application No. 63/403,521, filed Sep. 2, 2022, the content of which is hereby incorporated by reference in its entirety.

TECHNICAL FIELD

This document describes systems and methods for data translation, validation, and representation. More specifically, this document describes services and interfaces for automatic translation and translation validation of text in applications and databases.

BACKGROUND

This specification relates to graphical user interfaces. Data validation is the process of verifying that a program operates on clean, correct and useful data. Data validation processes use routines that check for correctness, meaningfulness, and security of data that are input into the system. Validation can be performed on the client-side (for example, on a web page or on the server side). Client side validation general includes the use of scripting languages. Server side validation may be written in a conventional programming language.

SUMMARY

The data processing system described in this specification enables a user to generate non-application specific statements for controlling execution of an application that executes on a user device (client device). The application can include a browser. The statements can be written to control behavior of a webpage or application at the user. The data processing system enables a user to provide non-application specific statements, such as SQL queries or commands. These non-application specific commands are uniform in syntax an enable the user to access other systems, such as web services, databases, and so forth, using the commands with a uniform syntax. The non-application specific commands are transformed by the data processing system into application-specific statements or commands, depending on the application referenced in the commands. The non-application specific statements include MvSQL statements. An MvSQL statement is a version of a SQL query language that can be converted into other versions of the SQL query language. In general, SQL is a special-purpose programming language designed for managing data held in a relational database management system (RDBMS) or for stream processing in a relational data stream management system (RDSMS). While SQL serves as a rough standard, different RDBMS vendors have constructed their own versions of SQL. For example, ORACLE, SQL-SERVER, and DB2 (all relational database vendors) each have a respective proprietary SQL syntax. MvSQL is a version of SQL that is generally compatible or transformable into different proprietary syntaxes. In general, MvSQL specifies the operations of a SQL statement that can be transformed into the proper syntax for the proprietary SQL language at runtime.

The data processing system described in this specification enables a user to generate MvSQL statements as inputs for programming or otherwise interacting with an application. In an example, the application includes a browser. The data processing system enables a user to configure a program, webpage, or other code for execution in a browser environment using MvSQL commands. For example, the user is able to both generate code for different application programming interfaces (APIs) by the program, but also generate proprietary queries for accessing databases using a single, common MvSQL syntax. The user can program service calls using MvSQL syntax, which can be transformed into another command type (such as Javascript).

In an example, the statements can be used to validate data (e.g., at a user interface) before data are sent to the server for further processing (or at all). The system enables the application or browser, for example, to update the user interface as a user interacts with the user interface, such as by adding or removing fields based on user input or data provided by the user (e.g., metadata describing the user or the user's device). For example, if the application detects a location of the user responsive to receiving data describing the user, the application can update the user interface to correspond to the location of the user as needed. The system transforms the SQL statements into application-specific statements for interaction with the application or browser.

The system described herein enables SQL queries to be written once and executed against in-memory data as well as data persistently stored in a database. The SQL statement is modified to perform functions against the data on a user interface. For example, the data on the user interface can be mapped into fields referenced in the SQL statement. The SQL statement can then be programmatically altered to include that data in the place of a table.

In general, one innovative aspect of the subject matter described in this specification can be embodied in methods that include the actions of receiving, by a computer system, a statement to perform operations on data stored in a data storing application, the data including fields. The methods include the actions of identifying the application-specific syntax (or programming language) based on the data store. The methods include the actions of transforming the received statement into a query language specific statement. The methods include the action of identifying at least one operation of the operations that is not supported by the application-specific statement. The methods include the action of obtaining a function to replace the unsupported operation. The methods include the actions of applying the function to the application-specific statement. The methods also include the actions of providing the application-specific statement to the data storing application for processing.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include identifying a first data type of a first field in the first set of fields, identifying a second data type of a second field in the second set of fields, identifying a conversion command to convert from the first data type to the second data type, and adding the conversion command to the second executable statement. The methods may include the actions of receiving result data from the database associated with the execution of the operations in the second executable statement, and determining that the data from the user interface is invalid based on the result data. The methods may include the actions of identifying a first operation of the operations in the first executable statement, identifying a proprietary function corresponding to the first operation and inserting the proprietary function into the second executable statement. The methods may include the actions of validating data in the database by providing the first executable statement to the database. Generating a second executable statement based on the first set of fields and the first executable statement may include providing an alias for the derived table, and updating the second executable statement to reference the alias.

Particular embodiments of the subject matter described in this specification can be implemented to realize one or more of the following advantages. Using the same statement to validate data on a user interface and data stored in a database has the advantages of reducing the number of programs that need to be developed and maintained. The costs associated with developing, testing, and maintaining a computer program or application are thereby reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C shows an example interface for configuring a browser-based program.

FIG. 7 illustrates an example of a user interface.

Like reference numbers and designations in the various drawings indicate like elements.

DETAILED DESCRIPTION

The data processing system described in this specification enables a user to generate non-application specific statements for controlling execution of an application that executes on a user device (client device). The application can include a browser. The statements can be written to control behavior of a webpage or application at the user. The data processing system enables a user to provide non-application specific statements, such as SQL queries or commands. These non-application specific commands are uniform in syntax an enable the user to access other systems, such as web services, databases, and so forth, using the commands with a uniform syntax. The non-application specific commands are transformed by the data processing system into application-specific statements or commands, depending on the application referenced in the commands. The non-application specific statements include MvSQL statements. An MvSQL statement is a version of a SQL query language that can be converted into other versions of the SQL query language. In general, SQL is a special-purpose programming language designed for managing data held in a relational database management system (RDBMS) or for stream processing in a relational data stream management system (RDSMS). While SQL serves as a rough standard, different RDBMS vendors have constructed their own versions of SQL. For example, ORACLE, SQL-SERVER, and DB2 (all relational database vendors) each have a respective proprietary SQL syntax. MvSQL is a version of SQL that is generally compatible or transformable into different proprietary syntaxes. In general, MvSQL specifies the operations of a SQL statement that can be transformed into the proper syntax for the proprietary SQL language at runtime.

The data processing system described in this specification enables a user to generate MvSQL statements as inputs for programming or otherwise interacting with an application. In an example, the application includes a browser. The data processing system enables a user to configure a program, webpage, or other code for execution in a browser environment using MvSQL commands. For example, the user is able to both generate code for different application programming interfaces (APIs) by the program, but also generate proprietary queries for accessing databases using a single, common MvSQL syntax. The user can program service calls using MvSQL syntax, which can be transformed into another command type (such as Javascript).

Figure 1A:
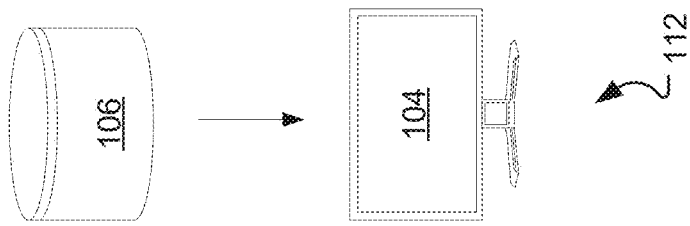
FIGS. 1Aa-1Ac illustrates an example of executing MvSQL code against data from a user interface.
Figure 1A:
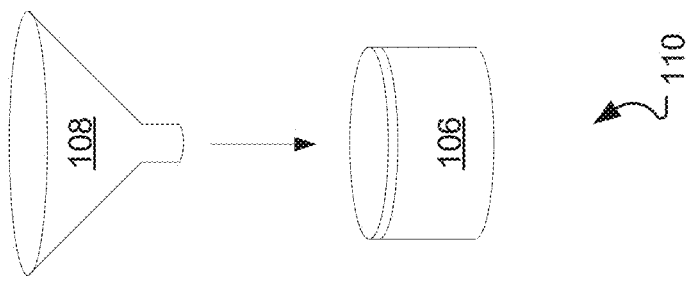
Figure 1A:
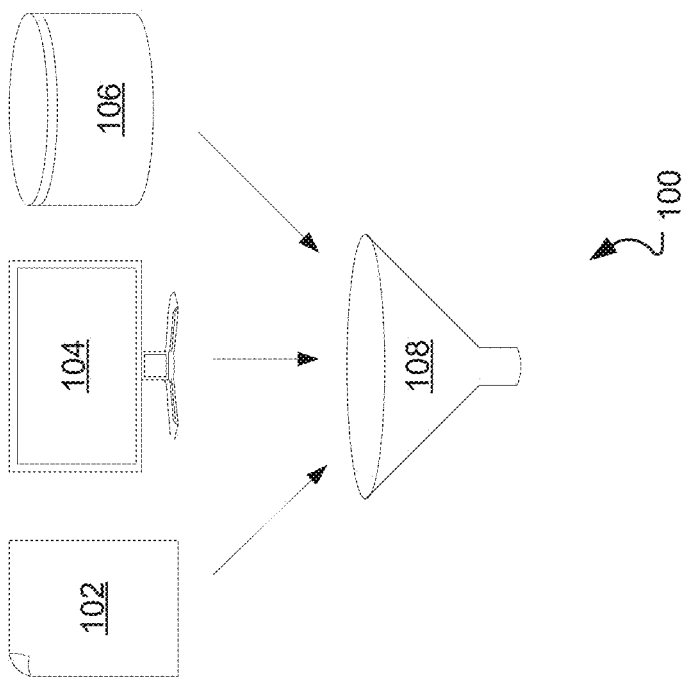

FIGS. 1Aa-1Ac illustrates an example of executing MvSQL code against data from a user interface. Referring to a first section 100 of the FIG. 1Aa, a statement processor 108 accepts an MvSQL statement 102 and data from a user interface 104. In some implementations, the statement processor 108 also accepts a data definition from, for example, a database I 06. While the disclosure herein refers to MvSQL, the processes and systems described herein are not limited to MvSQL in particular and can be applied to any query language that can be transformed into a computer-executable statement.

An MvSQL statement is a version of a SQL query language that can be converted into other versions of the SQL query language. In general, SQL is a special-purpose programming language designed for managing data held in a relational database management system (RDBMS) or for stream processing in a relational data stream management system (RDSMS). While SQL serves as a rough standard, different RDBMS vendors have constructed their own versions of SQL. For example, ORACLE, SQLSERVER, and DB2 (all relational database vendors) each have their own proprietary SQL syntax. MvSQL is a version of SQL that is generally compatible or transformable into different proprietary syntax. In general, MvSQL specifies the operations of a SQL statement that can be transformed into the proper syntax for the proprietary SQL language at runtime.

The user interface I 04 may be, for example, a web page presented in a web browser or a client side application developed using conventional graphical user interface technologies. In general, the user interface may include fields that hold values. For example, the user interface may include input fields which accept input from an input device on the client computer or other user device. The user interface may also include hidden or un-editable fields that store data. The input field may be an HTML input field, check box, radio button, select box, multiple select box, slider, etc. The storage fields may include a hidden field, label, or read only input field. In some scenarios, additional data may be stored in HTTP Cookies (data sent from a website and stored in a user's web browser while the user is browsing that website) or in an HTTP Session (data associated with individual visitors to a web site).

A data definition defines data types for different fields. A data type is a classification identifying one of various types of data, such as numeric, decimal, character, variable length character strings, date time, etc. The data type determines the possible values for a data value. The data type can also determine operations that can be done on the data value. The data type can also define how the data is stored in a persistent data store and in memory.

The statement processor 108 can accept the MvSQL statement and the data from the user interface the data definition and generate an application-specific statement that can be executed by the target application. Referring to the second section 110 of FIG. 1, the SQL statement generated by the statement processor 108 may include instructions that cause a relational database 106 or in-memory statement processing system to perform operations on data that has not been persistently stored by a system hosting the application (e.g., a database for a service). For example, the SQL statement may select values from a derived table. In general, a derived table is a temporary table created by means of a subquery in the FROM clause of a SQL SELECT statement. The derived table is specific to the SQL command that creates it. In some implementations, the derived table exists in the non-persistent memory of a computer executing the database and behaves like a standard view or table.

Accessing data in the derived table can be relatively fast because the derived table can exist only in memory. Using the existing relational database 106 process, the SQL statement has the advantage of being processed without requiring an additional overhead in developing, obtaining, or executing a separate in-memory statement processor 108. In contrast, an in-memory query processing system can be optimized to execute queries in memory.

The SQL statement is provided to a relational database 106 for processing. The SQL statement can be executed by the relational database. Referring to the third portion 112 of FIG. 1Ac, results from the SQL statement executed by the relational database 106 can be provided to the user interface 104. For example, the data returned from the SQL statement may be sent to the user interface 104 directly. Alternatively, the data returned from the SQL statement may be further transformed before being provided to the user interface 104.

The user interface 104 can process the provided results. For example, receiving results of a SQL statement that verify that the contents of the fields on the user interface 104 are valid may cause the user interface 104 to identify and highlight one or more fields that contain invalid values. Alternatively or additionally, the user interface 104 may display an error message. In general, the user interface may utilize the results of the SQL statement in order to enhance the experience of the user.

Figure 1B:
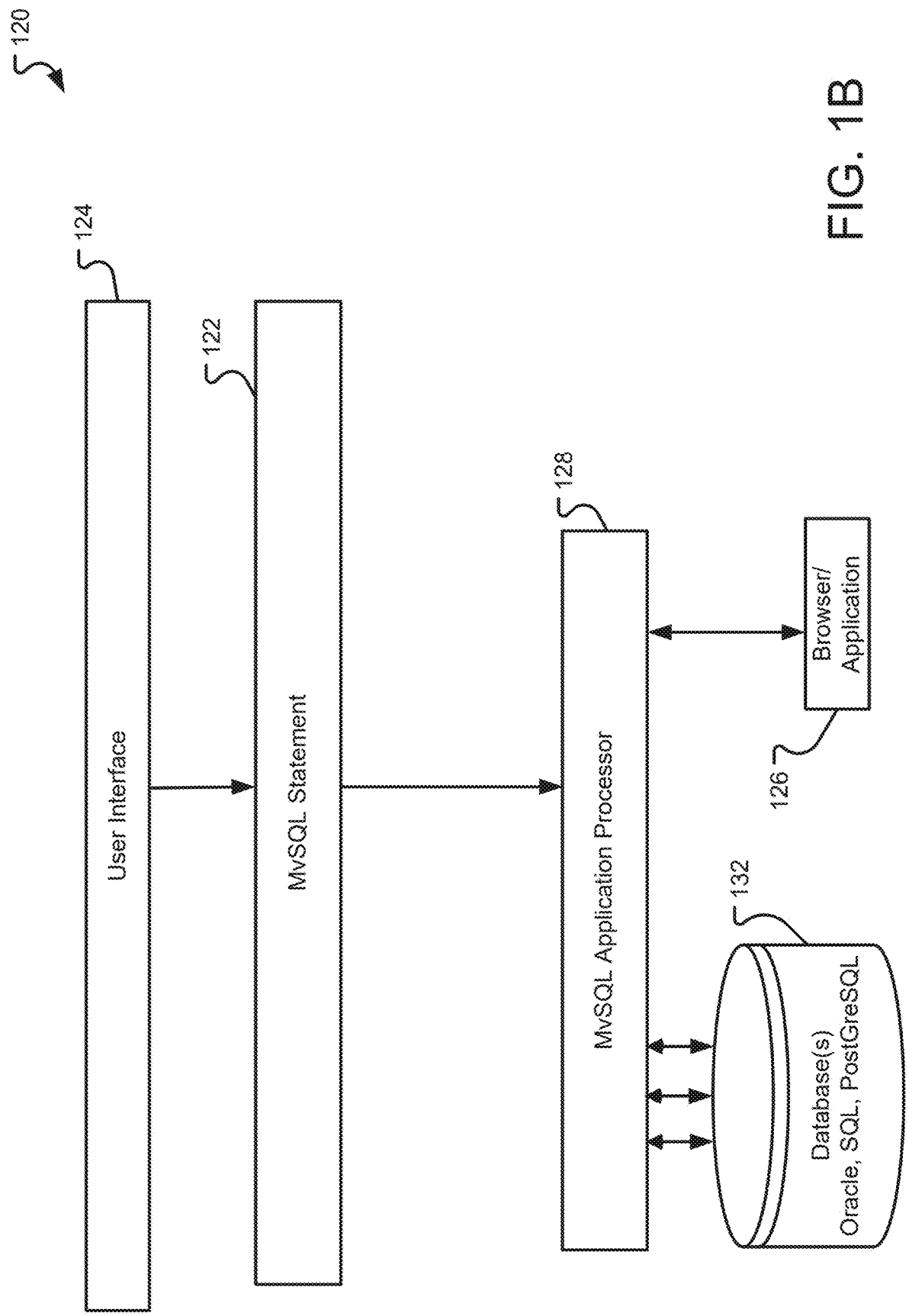
FIG. 1B illustrates an example of an MvSQL application processor configured to process data at for an application.

FIG. 1B shows an example system 120 that includes an MvSQL application processor 128 for processing MvSQL statements 122 for a browser or application 126. The MvSQL application processor 128 is configured to transform MvSQL statements 122 into application-specific or browser-specific statements for controlling operation of the application 126. The MvSQL application processor can be configured to validate data at a client device before any data are sent to a server device, such as a statement processor 108 130 that accesses database layer 132. The MvSQL application processor 128 is configured to update a user interface 124 of the application based on input received from a user or based on other data received by the application or browser 126 from the user or user device. The MvSQL application processor 128 is configured to generate application-specific commands for updating forms, validating data, and similar operations being performed by the application or browser 126. The MvSQL application processor 128 translates MvSQL statements 122 into application-specific commands Thus, a webpage or application developer can use only MvSQL statements to configure the application or browser 128.

FIG. 1C shows an example interface 150 for configuring a browser-based program. The interface 150 enables a user to configure operations for an application executing in a browser. The interface 150 enables a user to configure service calls using MvSQL commands. The user can specific application settings 152, define data sources 154, configure data layer tables 156, define business rules 158, configure generation of notification 160, specify user interface pages 162, configure user interface menus 164, and configure application security 168 using the common interface 150. For example, the interface 150 shows configuration of a data source 154, which in this example is a service 170 that provides data describing the weather. Tables 172 generated by the service 170 are shown, so that the user can select and configure how data from the service are being used in the application. For example, the user may want to display weather data in a portion of a webpage.

The interface 150 enables the user to define data links 174 between the service 170 and the application. The links are defined based on parameters specified by the user. A test results window 176 shows the result of a test of a service call. The results of the service call can be configured for display in the user interface of the application being configured, such as by configuring the user interface pages 162 of the application.

Figure 1D:
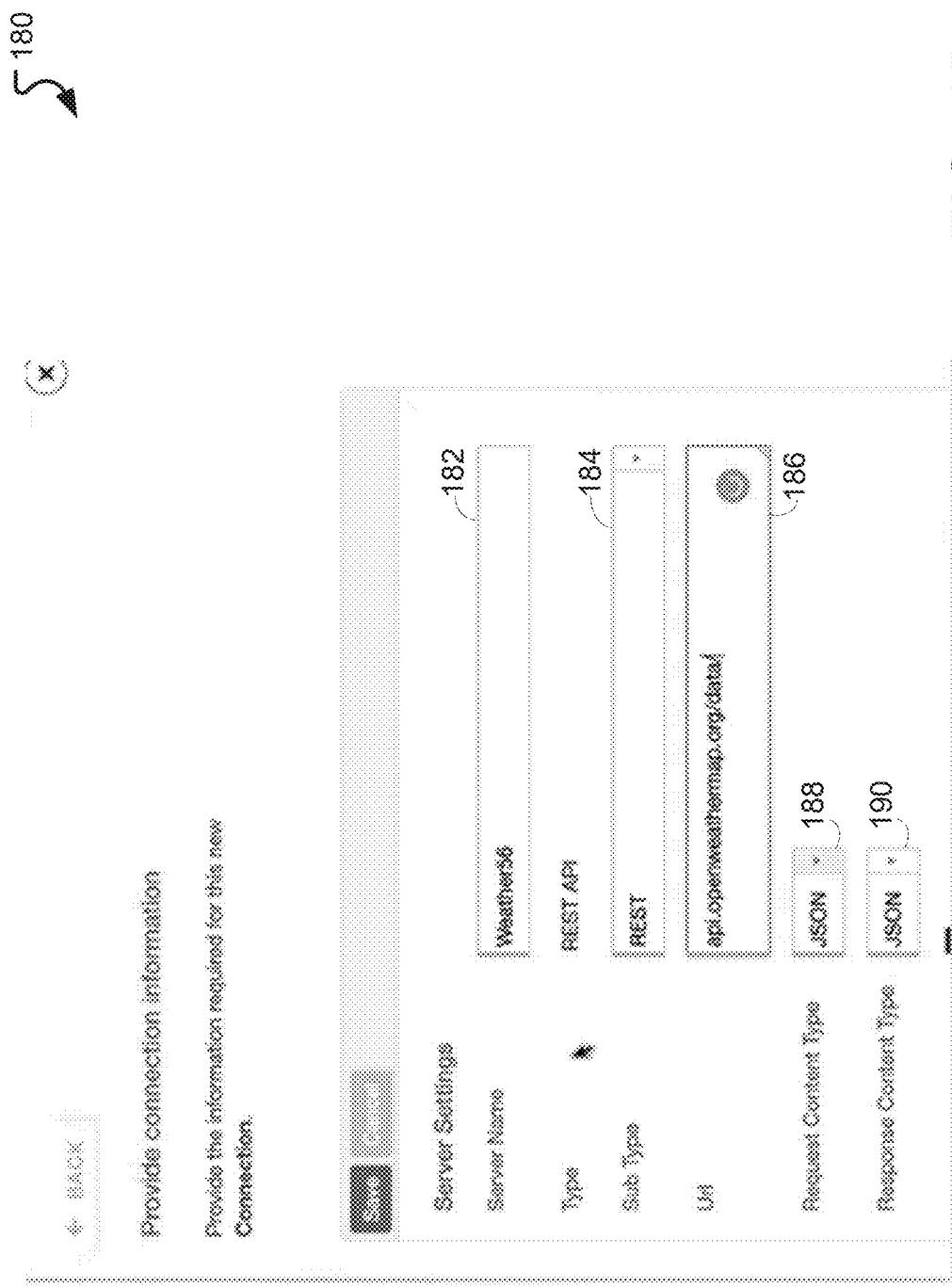
FIG. 1D shows an example interface for configuring a browser-based program.

FIG. 1D shows an example interface 180 for configuring a service call for the application defined in the user interface 150 of FIG. 1C. The interface 180 enables the user to define how the application accesses data from the service 170. For example, the user indicates a location, or a server name 182 for accessing the weather data. The user indicates a type 184 of interface that is expected at the service. In this example, the type is a RESTful API. The user indicates the path, such as a URL 186 for accessing the service. The path in this example is api.openweatherapp.org/data/. The user defines a request content type 188 and a response content type 190. In this case, each of the request 188 and the response 190 are JSON type.

Once the connection is configured, the MvSQL application processor 128 is able to transform MvSQL commands into application-specific commands that are able to access the data from the application (in this example, the service). A user can configure the browser application or webpage using MvSQL statements. The MvSQL application processor transforms the statements depending on the target data source, and provides response data that can be further manipulated by the user as needed for the application executing in the browser.

Figure 2:
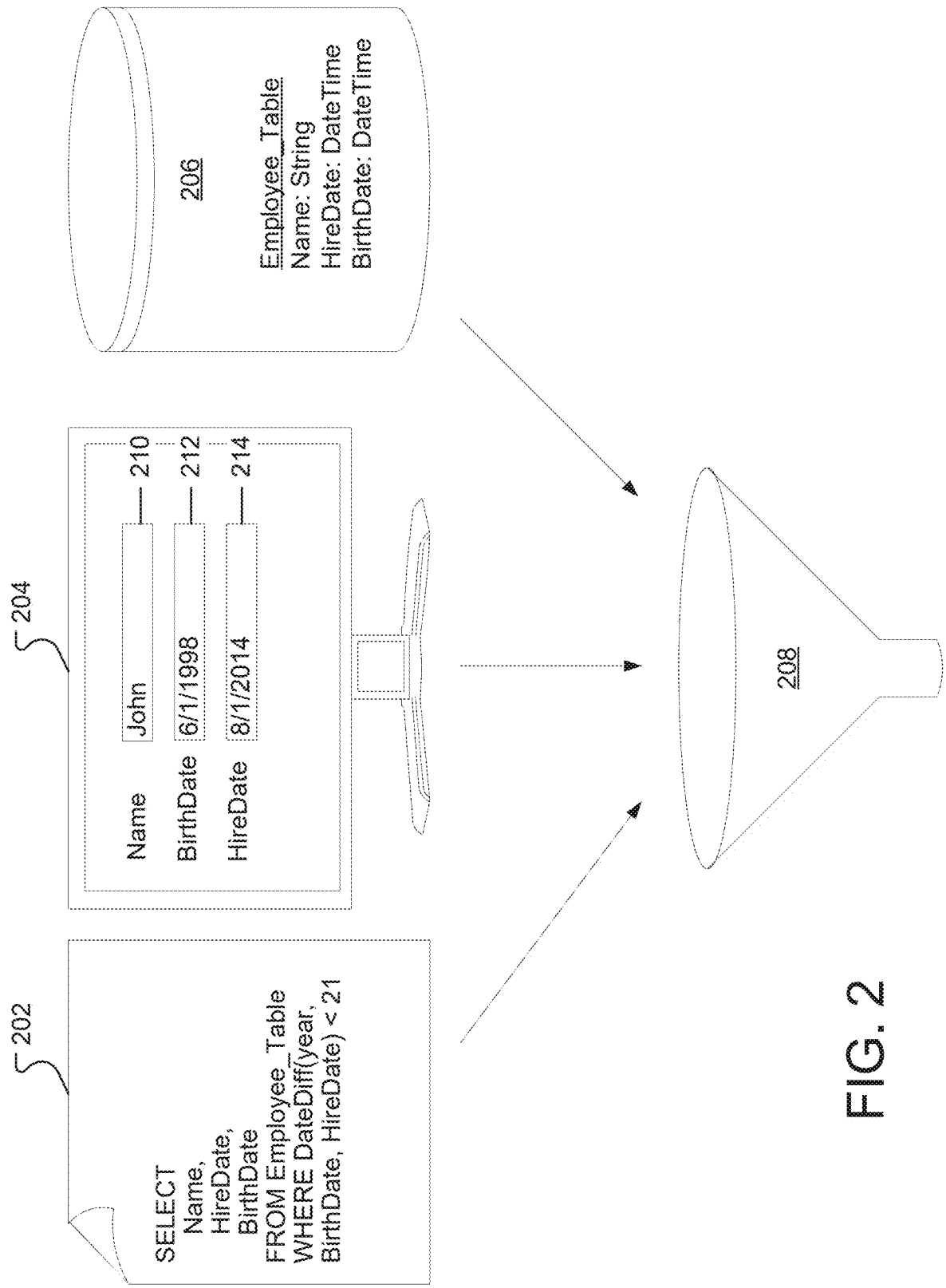
FIG. 2 illustrates an example of generating an SQL statement against data on a user interface.

FIG. 2 illustrates an example process of generating an SQL statement. Generally, a statement processor I 08 208 can generate an SQL statement using information from an MvSQL statement 202, a user interface 204, and, optionally, a data dictionary 206.

The MvSQL Statement 202 provides instructions for manipulating data. In this example, the MvSQL statement is "SELECT Name, HireDate, Birthdate, FROM Employee_Table WHERE DateDiff (year, BirthDate, HireDate) <21". The MvSQL statement instructs a database to object (select) the values from the columns Name, HireData, and Birthdate from a table named Employee_Table that meet the criteria that the difference between the value in the BirthDate column and the value in the HireDate columns is less than 21 years.

A user interface 204 can be used to obtain data from a user. The user interface 204 includes fields that contain data. Each field has a name. For example, a Birthdate field 212 may be generated based on the html text:
    <INPUT type="text" name="Birthdate" maxlength="IO">

In this example, the name attribute provides a name by which the field may be referenced (in this example, "Birthdate"). The size attribute indicates the size of the field in characters. The type attribute with the value "text" indicates that the input field is a text field. The possible values for the type attribute depend on the version of HTML standard. For example, other possible values for the type attribute include but are not limited to: button, check box, color, date, datetime, datetime-local, email, file, hidden, image, month, number, password, radio, range, reset, search, submit, tel, text, time, URL, and week. Not all types are available for all versions of HTML. For example, datetime and datetime-local are only available in HTML5 (i.e. the 5th revision of the HTML standard).

In general, the names associated with an input field are not otherwise related to the graphical presentation of the field. The labels shown on the user interface 204 are included for explanatory purposes. The names of the fields are defined within the attributes of the HTML field and are generally not displayed on the screen. Instead, labels located near the input fields may not correspond directly to any attribute of the underlying HTML.

In this example, the user interface 204 includes a Name field 210, a BirthDate field 212, and a HireDate field 214.

A data dictionary 206 includes information about the data on the user interface that can be used to construct the SQL statement. The data dictionary 206 describes the data type of different elements on the user interface. In some implementations, the statement processor 108 is programmed to assign a default data type of "string" to any field that does not have a data type defined in the data dictionary, or if no data dictionary is provided.

In some implementations, the data dictionary may be determined using conventional techniques from a database management system and the MvSQL statement. For example, the MvSQL statement references the Employee Table. By accessing the system catalogs for the relational database, the system can determine a data type for each column in the Employee Table. In other implementations, the data dictionary may be a separate file or other data structure (for example, a hash table, dictionary, lookup table, etc.) that contains a mapping of different fields to their data types. For example, the Name field is mapped to a string and the HireDate and BirthDate fields are mapped to a datetime.

Figure 3:
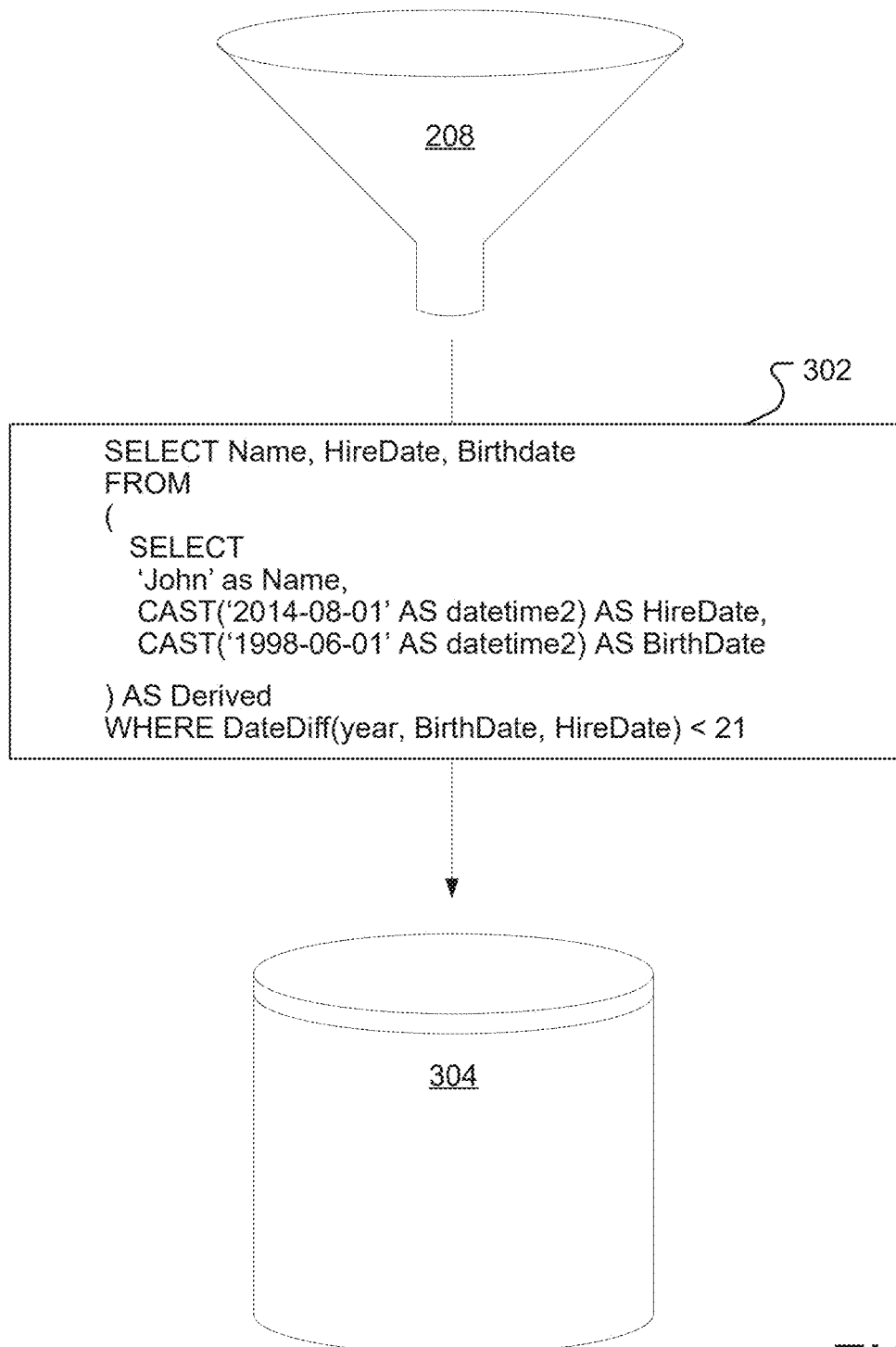
FIG. 3 illustrates an example of generating an SQL statement against data on a user interface.

Referring to FIG. 3, the statement processor 108 208 generates a SQL statement 302 using the MvSQL statement, the user interface, and the data dictionary.

The query process can identify columns and table referenced by the MvSQL statement. In this example, the statement processor 108 208 identifies the columns Name, Hire-Date, BirthDate and the table Employee Table. The columns and table may be identified by parsing the MvSQL statement using conventional parsing techniques (for example, regular expressions).

Data from the user interface is mapped into the columns. For each column, the statement processor 108 may identify a field on the user interface that corresponds to the column as well as any data type associated with the column. In some implementations, the fields on the user interface are identified by matching the name of the fields in the SQL statement to the fields having the same name on the user interface. In other implementations, the fields on the user interface are identified using a data structure that maps the name of the fields on the user interface to the name of the fields of the MvSQL statement. The data structure can be included in a separate file, table, or other persistent data store. In some implementations, the data structure can be stored on the HTML page displayed in the user interface (for example using hidden fields, scripting, or embedded in the comments).

In this example, the statement processor 108 identifies "John" as the "Name," "08/01/2014" as the "HireDate," and "06/01/1996" as the "Birthdate."

The statement processor 108 208 replaces the identified table in the SQL statement with a command to create a derived table. The statement processor 108 creates the SQL statement that then creates the derived table using the values obtained from the user interface and applying an alias to the values. An alias is a second name that can be used to reference the data that is the subject of the alias. For example, in SQL the keyword AS is used to assign an alias to the column or a table. The AS keyword is inserted between the column name and the column alias or between the table name and the table alias.

The statement processor 108 may also cast some or all of the values into the appropriate data type. Casting is an operation that performs a type conversion that explicitly changes data of one data type (for example, a string) into another (for example, a date). Casting the data from the user interface into a particular type may be necessary for some functionality to work correctly; for example, certain functions can only be performed using data in a particular format. In this example, the statement processor 108 casts the "HireDate" and "Birthdate" fields to date time values. In some scenarios, it may be necessary to reformat the data provided by the user interface before the data can be cast into the appropriate type. In this example, the "HireDate" field contains a value in the format "mm/dd/yyyy", where "mm" is a two digit month, "dd" is a two digit day, and "yyyy" is a four digit year. The function that casts the value into a date requires the string to be in the format "yyyy-mm-dd." The statement processor 108 208 can manipulate the data values from the user interface to generate strings in the appropriate formats for casting or other operations.

In this example, the command to create the derived table is "(SELECT 'John' as Name, CAST ('2014-08-01' AS datetime2) AS HireDate, CAST ('1998-06-01' AS datetime2) AS BirthDate) AS Derived". In this example, derived table includes a single row of data, however, other commands can be used to generate derived tables having multiple rows. In this example, the derived table is provided with an alias ("Derived").

The command to create the derived table is inserted into the SQL statement in place of the table. If the alias of the name of the derived table is different from the name of the table or tables included in the MvSQL statement, then the SQL statement can be updated to reference the derived table (for example, "SELECT DERIVED.NAME, DERIVED.HIREDATE, DERIVED.BIRTHDATE FROM . . . " or alternatively "SELECT DERIVED.* FROM . . . ).

The conditional logic in the where clause of the MvSQL statement remains at the end of the SQL statement.

Figure 4:
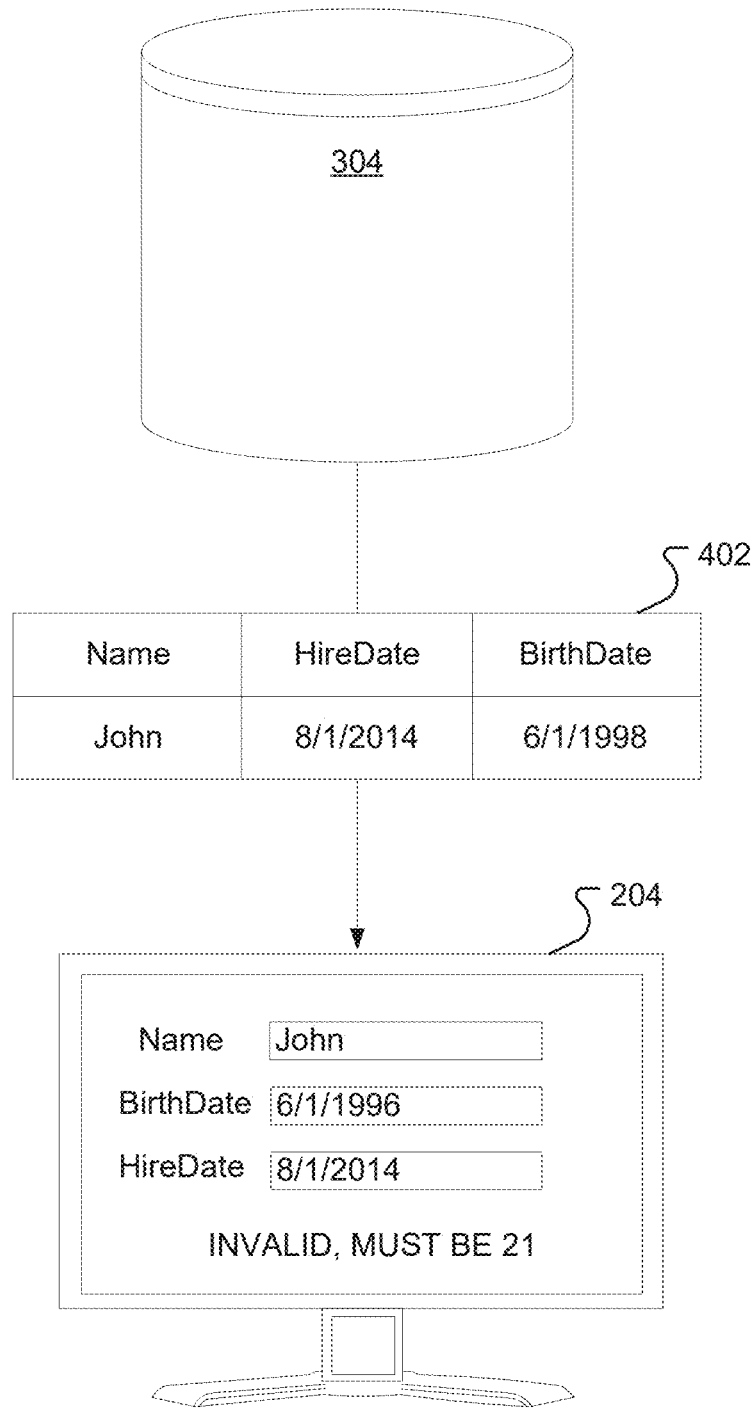
FIG. 4 illustrates an example of generating an SQL statement against data on a user interface.

The SQL statement is sent to the database management system 304. The database management system 304 may be the database management system that provided the data dictionary or it may be another database management system. In this example, the database 304 is a relational database. Referring to FIG. 4, the database management system 304 executes the SQL statement. In this example, executing the SQL statement does not require the database management system to access data stored in the tables of the database management system.

In this example, the database management system identifies the row in the derived table as meeting the criteria described by the where clause (e.g. the difference between the hire date and the birth date is greater than 21 years). The database management system creates a record set or similar data structure to report the results of the SQL statement. In this example, the record set includes a single data record which includes the details from the derived table.

The user interface 204 receives the record set or receives data from a system that processes the record set. In response, the user interface 204 may update the display to present information. In this example, the user interface presents an error message indicating that the employee must be at least 21 years of age. In some implementations, the query process or other system receives the results of the query. The results of the query can be preprocessed before providing the data to the user interface. For example, a JAVA SERVLET can use the information in the result set to generate a new page to display on the user interface.

Figure 5:
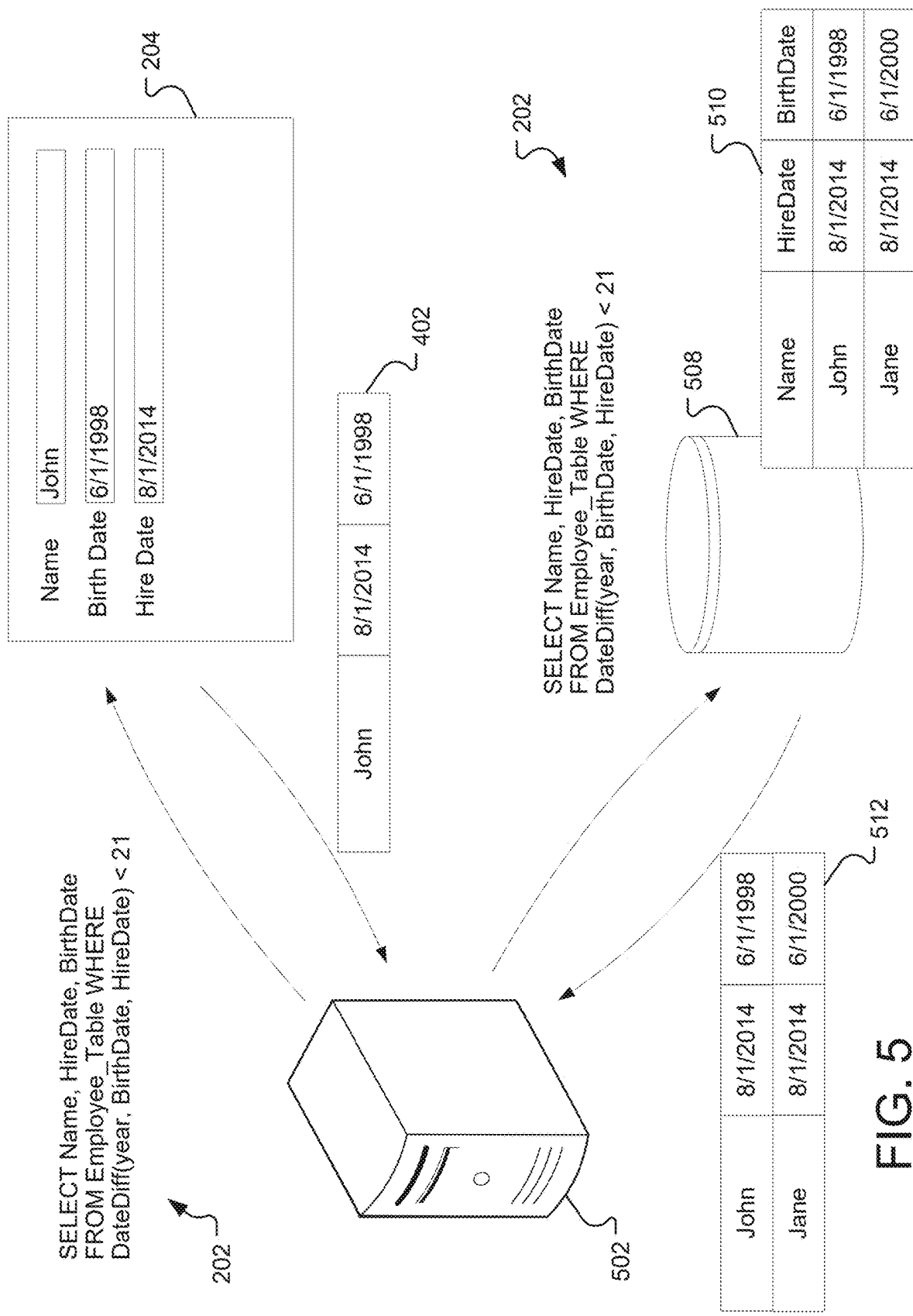
FIG. 5 illustrates an MvSQL statement being used to check data on a user interface and data in a database.

FIG. 5 illustrates an MvSQL statement being used to check data on a user interface and data in a database. The same MvSQL statement can be used to interact with data from a user interface and data stored in a database management system. For example, an application server 502 or other computer system can store MvSQL statements. The statement can be, for example, MvSQL statements that perform data validation. The statements can include, for example, the MvSQL statement 202.

As described above, the MvSQL statement 202 can be executed against the data from within a user interface 204. As described above, executing MvSQL statement 202 against the data on the user interface 204 can include processing the MvSQL statement as described above to generate a new SQL statement, including a derived table.

The MvSQL statement 202 can also be executed against data stored in a database management system 508. In this example, the database management system 508 includes an Employee_Table 510 that stores employee data. The SQL statement 202, when executed against the data in the Employee_Table table, produces two records 512, which are provided to the application server 502.

Figure 6:
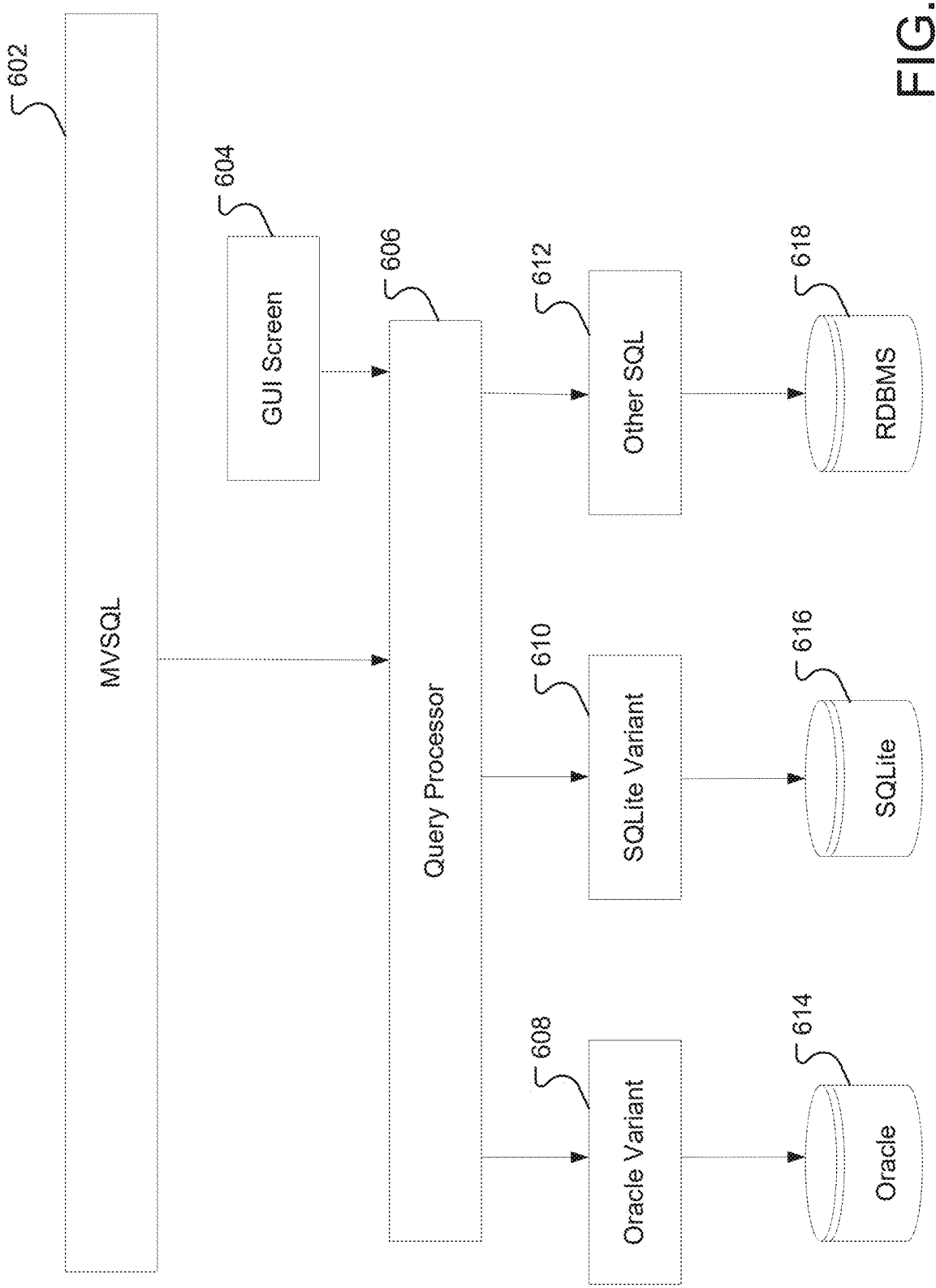
FIG. 6 illustrates transforming the MvSQL statement to different proprietary versions of SQL.

FIG. 6 illustrates the transformation of the MvSQL statement into different proprietary versions of SQL. The MvSQL statement may be further altered to account for variations in the SQL programming language as implemented in different database management systems.

A statement processor 108 606 receives the MvSQL statement 602. The statement processor 108 606 can transform the MvSQL statement 602 into an ORACLE specific variant 608 suitable for execution against an ORACLE database. For example, an ORACLE specific SQL statement for the MvSQL statement, "SELECT Name, HireDate, Birthdate, FROM Employee_Table WHERE DateDiff (year, BirthDate, HireDate)<21," may be:
SELECT Name, HireDate, BirthDate
FROM Employee_Table
WHERE floor(months_between(BirthDate, HireDate)/12)<21

The query process 606 can transform the MvSQL statement 602 into a SQLite specific variant 610 suitable for execution against SQLite 616. For example, an SQLite specific SQL statement for the MvSQL statement, "SELECT Name, HireDate, Birthdate, FROM Employee_Table WHERE DateDiff (year, BirthDate, HireDate)<21," may be:
SELECT Name, HireDate, BirthDate
FROM Employee_Table
WHERE (strftime('%Y', HireDate)-strftime('%Y', BirthDate))-(strftime('%m-%d', HireDate)<strftime('%m-%d', BirthDate))<21

The statement processor 108 606 can also transform the MvSQL statement 602 into other SQL variants 612 to access other relational database management systems (RDBMS) 618. For example, a MICROSOFT SQL SERVER specific variant of the MvSQL statement, "SELECT Name, HireDate, Birthdate, FROM Employee_Table WHERE DateDiff (year, BirthDate, HireDate)<21," may be:
SELECT Name, HireDate, BirthDate
FROM Employee_Table
WHERE DATEDIFF(YEAR, BirthDate, HireDate)<21

A MYSQL specific variant of the MvSQL statement, "SELECT Name, HireDate, Birthdate, FROM Employee_Table WHERE DateDiff (year, BirthDate, HireDate)<21," may be:
SELECT Name, HireDate, BirthDate
FROM Employee_Table
WHERE TIMESTAMPDIFF(YEAR, BirthDate, HireDate)<21

The statement processor 108 606 can also transform the MvSQL statement 602 into commands 620 to create, read, update, and delete from other third party systems 322. For example, the mySQL can be transformed into access commands to access data from customer relationship management systems, such as SALESFORCE, enterprise resource management system, such as SAP. Other examples of third party systems 322 include NoSQL databases. NoSQL databases provide mechanisms for storage and retrieval of data that is modeled in means other than the tabular relations used in traditional relational databases. Examples include column databases (such as HBASE), document stores (Such as Lotus Nodes, and APACHE COUCH DB), key-value databases (such as ORACLE NOSQL DATABASE), graph databases (such as ALLEGRO), and multi-model databases (such as ORIENTDB).

In some implementations, the statement processor 108 606 may identify an operation that has not been implemented in the target data store (either in the proprietary SQL variant or in the third party data store). The functionality provided by the absent operation can be provided by a function that is applied to a result set after the command is executed. The functions can be stored in a function library 624.

For example, the other system 622 may not have the innate ability to concatenate fields. When the statement processor 108 receives the MvSQL statement:

SELECT CONCATENATE (first_name, last_name) AS NAME
FROM customer-table
WHERE last name='Smith'

The statement processor 108 606 may determine that SALESFORCE does not include a concatenate function as part of the API used to access the account. The statement processor 108 606 can check a function library 624 to determine if a function exists to substitute for the CONCATENATE operation. The commands can be compiled functions accessible by the statement processor 108 620 or other systems. In this example, the statement processor 108 606 identifies a function for the CONCATENATE operation.

Accordingly, the query-pre-processor 606 generates commands to obtain the first name and last name from an object in SALESFORCE, without concatenating the results.

Once the results are received, the statement processor 108 606 can apply the identified function to each result in the results of data provided in response to the result set (the set of all results provided by the system receiving the command.

For example, if the statement processor 108 606 receives two results:

| FIRST NAME | LAST NAME |
|---|---|
| John | Smith |
| Mary | Smith |

The statement processor 108 may concatenate the first name and last name fields to produce a new result set. The new result set can include the results of the operation and can rename the result based on any ALIAS included in the command (in this example, the concatenated field is renamed NAME)

| NAME |
|---|
| John Smith |
| Mary Smith |

In some implementations, a system or component other than the query process 606 can process the result set and apply any identified functions. For example, the system may include a results processor (not shown). In some implementations, the results may be processed by using parallel processing techniques (for example, a map reduce framework, multiple threads, etc.)

FIG. 7 shows an example of a user interface 700. In FIG. 7, a company field 702 identifies the name of the company. The company 702 field may be prefilled based other information provided by the user. For example, a user's login information may be associated with a particular company. In some implementations, the company field 702 may be specified by a user as part of a registration process.

An authentication type field 704 allows the user to select between a predetermined number of options (for example, using a drop down list). In some implementations, the user can select from a list including for example, Basic authentication, API key authentication, OAuth, or none. In some implementations, the system may require that the organization be associated with some authentication method (for example, none may not be a valid option.)

The authentication parameters field 706 allows the user to specify parameters based on the type of authentication selected in the authentication type field. In this example, the user has selected Basic authentication. As Basic authentication uses predefined entries in an HTTP header, the authentication parameters field 706 is disabled. If the user had, instead, for example, selected the API key authentication, the user would be able to specify the name of the parameter to include the API key.

The user interface 700 can also allow the user to specify the return format 710 of the RESTful service. As described above, the return format may be either JSON or XML. In this example, the user can select from a drop down list (for example, JSON, XML, query based, path based). In this example, the user has selected to receive JSON responses. Accordingly, the return format parameter 710 field is disabled.

The user interface 700 includes a pagination field 712 where the user can specify how results are paginated. In this example, the user may select from a drop down list that includes the valid options (for example, page, index, none). Here, the user has selected "index." The user can also specify the name of the pagination parameters. The pagination parameters may include the names of variables that will include the index 714 and the limit 714 values.

The user interface 700 also includes a parameter type field 718 that enables the user to define whether parameters are included in the query string, a path, an HTTP header, or a combination thereof. In this example, the user has selected query string parameters.

The user interface 700 also includes a parameter area 722 for presenting parameters defined in the user interface 700. In this example, the index and limit parameters appear (defined in the pagination parameters area, described above). The user may also sort the parameters, for example, by dragging and dropping a field. This enables the user to specify an ordering of parameters for services where the ordering is of interest.

The user interface 700 also includes a sample call 720. The sample call is a visual representation of what a call to an API component. It allows the user to check their data against the API.

Figure 8:
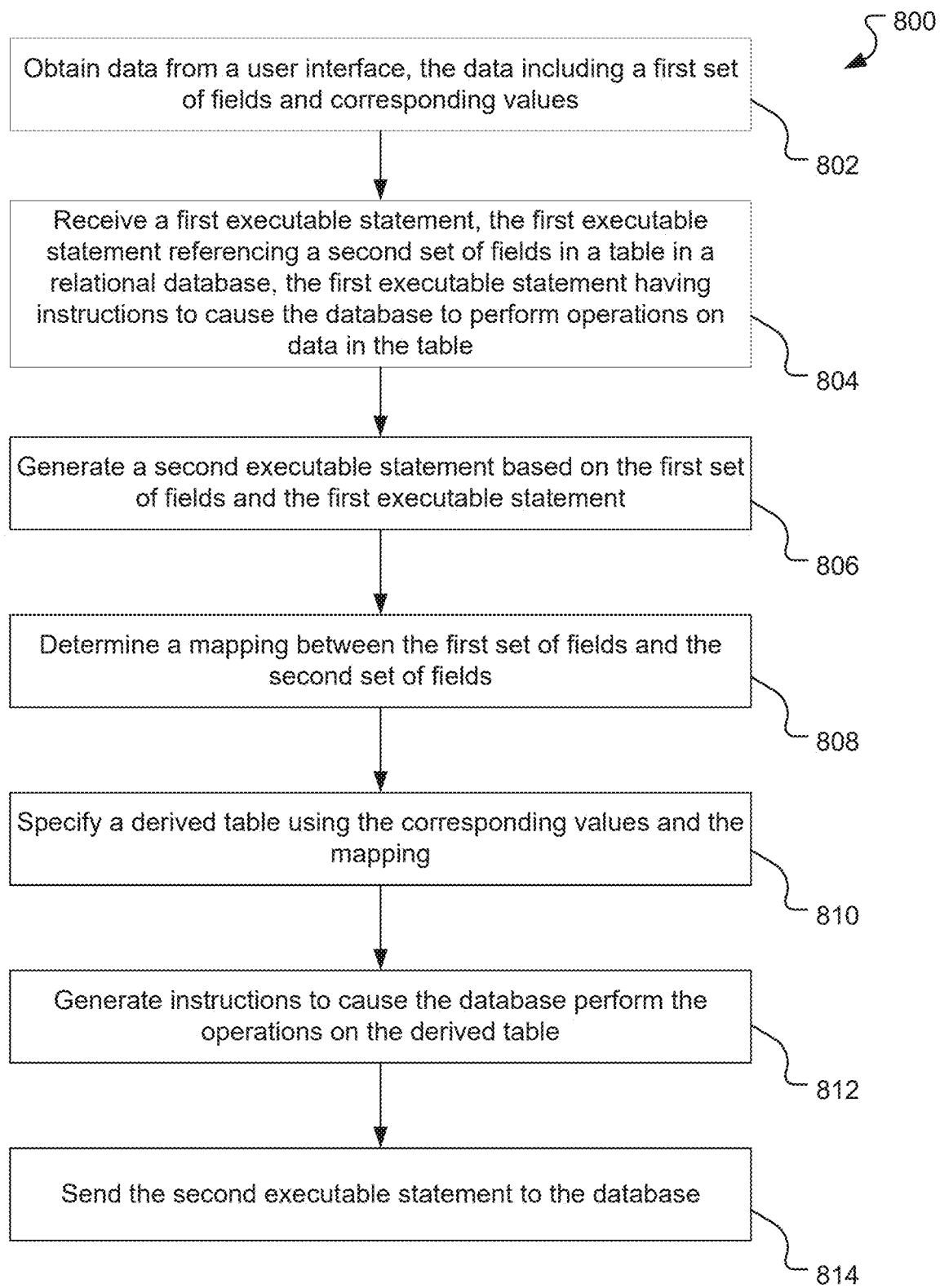
FIG. 8 is a flowchart of a process for using a source independent query language on data from a user interface.

FIG. 8 is a flowchart of a process 800 for using a source independent query language on data from a user interface. The process can be performed by one or more computers operating sequentially or in parallel. The process can be performed using conventional distribution programming techniques with some of the steps in the process being performed in parallel.

The process 800 obtains data from a user interface, where the data includes a first set of fields and corresponding values (802). The values can be obtained from the user interface using, for example, a scripting programming language that retrieves data from the user interface and sends that data to a server. The values can also be obtained through the submission of a form on the user interface.

The process 800 receives a first executable statement, where the first executable statement references a second set of fields in a table in a relational database. The first executable statement also having instructions to cause the database to perform operations on data in the table (804). The first executable statement can be, for example, an MvSQL statement.

The process 800 generates a second executable statement based on the first set of fields and the first executable statement (806). The second executable statement is configured to perform the operations described in the first executable statement on the data from the user interface.

Generating the second executable statement includes determining a mapping between the first set of fields and the second set of fields (808). In order to generate the second executable statement, the system identifies columns in the first executable statement and maps the columns of the first executable statement to the data from the user interface. Mapping the columns to the data can include identifying a data type associated with the data. For example, if the column is numeric, but the data is a string, the system can convert the data into the appropriate type, or it can provide instructions that cause the second executable statement to perform the conversion.

The generation of the second executable statement also includes specifying a derived table using the corresponding values and the mapping (810). The process 800 can construct a command to generate a derived table using the data from the user interface, including any data conversion operations that were identified.

Generating the second executable statement also includes instructions to cause the database to perform the operations on the derived table (812). In some implementations, the process 800 can insert the command to generate the derived table into the SQL statement in place of the table or tables identified in the from clause of the statement.

The process 800 sends the second executable statement to the database (814). The database can receive the second executable statement and perform the operations described by the statement on the data identified by the derived table.

In some implementations, a process for providing functions for unsupported operations can be performed. The process can be performed by one or more computers operating sequentially or in parallel. The process can be performed using conventional distribution programming techniques with some of the steps in the process being performed in parallel.

In this example, an MvSQL statement is received. The target data store is identified. The target data store is the data storage system which is being queries. As described above, the target data store can be a relational database or a NoSQL data store. Unsupported operations are identified. The system can identify operators and/or operations within the MvSQL statement. The system checks whether the operator and/or operations are supported by the target data store. In some scenarios, the functionality indicated by an operation may be supported by the target data store but the name may be different. For example, the functionality indicated by a CONCATENATE operation may be available in a database, but may be named CONCAT. A statement processor 108 can replace the CONCATENATE with CONCAT and allow the target data store to perform the operation. In some scenarios, the functionality indicated by the operation may not be supported natively by the target data store. For example, the target data store may have an operation which provides concatenation of two or more data elements.

Functions for unsupported operations are identified. If the system determines that the target data store does not support the operation in the MvSQL statement, the system can check if a function in the function library can support the operation. In some implementations, the function library may include a look up table the indexes available functions based a corresponding MvSQL operation. For example, the system may find an entry in the lookup table for the CONCATENATE operation. The entry may provide a pointer to a function. The pointer may be, for example, a name of a function that can be accessed using a dynamic library or class. The pointer may also be, for example, a memory location where the function may be found. In some implementations, if the no function is identified for an operation then an error is thrown.

The operations may be operations that act on one or more data fields, for example, the concatenate operation operates on two different data fields (or result fields) and generates a single field. Similarly, other operations may generate more or fewer outputs than the number of inputs required. In some scenarios, an operation may not require any inputs and may generate one or more outputs.

Operations may alter values associated with a field (for example, may change a date in the form MM/DD/YYYY such as 10/15/2015 to the form DD/MM/YYYY, such as 15/10/2015). Some operations may change the type of the field, for example, converting from a string to a number. Some operations may change the both the type and the value of a field. Changing a value of a field is considered distinct from changing the type of a field. In general, types of fields are used by computers and other computational system to process the data, but do not change the human readable value of the underlying data, as an example, casting a field from one data type (e.g. string) to another (e.g., varchar2) is a change of type, but not a change of value.

Identified functions are applied to input data. Some parameters are necessary to the proper execution of some commands. For example, a SQL update or insert statement requires input data in order to complete the statement. SQL select statements may include conditional clauses (e.g. WHERE clauses) that are used to limit the data requested. Some of these inputs may be modified by operations that are unsupported by the target data store. In this scenario, the functions may be applied to the input data before the command is executed. For clarity, the statements below are shown in an otherwise standard SQL format. The specifics implementations of SQL or other commands may vary as described above. In this, the command SELECT CONCATENATE (Address, City, State
FROM CUSTOMER
WHERE NAME=CONCAT('John','Smith')
May be changed to the MvSQL command
SELECT CONCATENATE (Address, City, State)
FROM CUSTOMER
WHERE NAME='John Smith'

By applying a concatenate function to "John" and "Smith." Note, that at his point the CONCATENATE function in the select clause remains.

Data access commands are created. The system can generate one or more commands for the target data store. In addition to transforming the MvSQL statement in commands specific to the target data store, the system can remove the identified function. In some implementations, the identified functions can be removed while applying the functions to the input data, above.

Continuing the example above, the command may be transformed into

SELECT Address, City, State
FROM CUSTOMER
WHERE NAME='John Smith'

A result set is received. The result set is the data returned by the target data store in response to the data access commands.

The identified functions can be applied to the data in the result set, as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage medium for execution by, or to control the operation of, data processing apparatus).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include (in addition to hardware) code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages and/or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic disks, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-transitory computer-readable media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual, auditory, or tactile feedback) and input from the user can be received in any form, including acoustic, speech, or tactile input. In addition, a computer can interact with a user by sending documents to and receiving documents from a device that is used by the user (for example, by sending web pages to a web browser on a user's client device in response to requests received from the web browser).

Embodiments of the subject matter described in this specification can be implemented in a computing system that includes a back-end component (e.g., as a data server), a middleware component (e.g., an application server), or a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    receiving, by a computer system, a statement to perform operations on data of an application, wherein the statement comprises a MySQL statement;
    transforming the received statement into an application-specific statement;
    identifying at least one operation of the operations that is not supported by the application-specific statement;
    obtaining a function to replace the unsupported operation;
    applying the function to a query language specific statement; and
    providing the application-specific statement to the application for processing;
    causing the application to perform the operations on the data; and
    causing, based on the processing, the application to display an updated user interface of the application, wherein the updated user interface is responsive to performing the operations on the data of the application.

2. The computer-implemented method of claim 1, wherein the application comprises a browser, and wherein the application-specific statement comprises a Javascript statement.

3. The computer implemented method of claim 1, wherein the function changes the value of a data element absent changing the type of the data element.

4. The computer-implemented method of claim 1, wherein the function changes the format of a data element.

5. The computer implemented method of claim 1, wherein the statement is a SQL statement and the data storing application is a NoSQL database.

6. The computer-implemented method of claim 1, wherein the function is obtained from a function library external to the data storing application.

7. The computer implemented method of claim 1, wherein the function accepts multiple inputs and produces a single output.

8. A system, comprising:
    at least one processor; and
    a memory storing instructions that, when executed by the at least one processor, cause the at least one processor to perform operations comprising:
        receiving, by a computer system, a statement to perform operations on data of an application, wherein the statement comprises a MySQL statement;
        transforming the received statement into an application-specific statement;
    identifying at least one operation of the operations that is not supported by the application-specific statement;
        obtaining a function to replace the unsupported operation;
        applying the function to a query language specific statement; and
        providing the application-specific statement to the application for processing;
    causing the
        application to perform the operations on the data; and
        causing, based on the processing, the application to display an updated user interface of the application, wherein the updated user interface is responsive to performing the operations on the data of the application.

9. The system of claim 8, wherein the application comprises a browser, and wherein the application-specific statement comprises a Javascript statement.

10. The system of claim 8, wherein the function changes the value of a data element absent changing the type of the data element.

11. The system of claim 8, wherein the function changes the format of a data element.

12. The system of claim 8, wherein the statement is a SQL statement and the data storing application is a NoSQL database.

13. The system of claim 8, wherein the function is obtained from a function library external to the data storing application.

14. The system of claim 8, wherein the function accepts multiple inputs and produces a single output.

15. One or more non-transitory computer readable media storing instructions that, when executed by at least one processor, cause the at least one processor to perform operations comprising:
    receiving, by a computer system, a statement to perform operations on data of an application, wherein the statement comprises a MySQL statement;
    transforming the received statement into an application-specific statement;
identifying at least one operation of the operations that is not supported by the application-specific statement;
    obtaining a function to replace the unsupported operation;
    applying the function to a query language specific statement; and
    providing the application-specific statement to the application for processing;
    causing the application to perform the operations on the data; and
    causing, based on the processing, the application to display an updated user interface of the application, wherein the updated user interface is responsive to performing the operations on the data of the application.

16. The one or more non-transitory computer readable media of claim 15, wherein the application comprises a browser, and wherein the application-specific statement comprises a Javascript statement.

17. The one or more non-transitory computer readable media of claim 15, wherein the function changes the value of a data element absent changing the type of the data element.

18. The one or more non-transitory computer readable media of claim 15, wherein the function changes the format of a data element.

19. The one or more non-transitory computer readable media of claim 15, wherein the statement is a SQL statement and the data storing application is a NoSQL database.

20. The one or more non-transitory computer readable media of claim 15, wherein the function is obtained from a function library external to the data storing application.

* * * * *